United States Patent
Ming et al.

(10) Patent No.: US 7,533,817 B2
(45) Date of Patent: *May 19, 2009

(54) COLOR BARCODE PRODUCING METHOD AND APPARATUS, COLOR BARCODE READING METHOD AND APPARATUS AND COLOR BARCODE REPRODUCING METHOD AND APPARATUS

(75) Inventors: Wei Ming, Foster City, CA (US);
Hiroshi Tomita, Foster City, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 567 days.

This patent is subject to a terminal disclaimer.

(21) Appl. No.: 10/913,347

(22) Filed: Aug. 9, 2004

(65) Prior Publication Data
US 2006/0027660 A1    Feb. 9, 2006

(51) Int. Cl.
*G06K 7/00* (2006.01)
(52) U.S. Cl. .............................. 235/462.04; 235/462.09
(58) Field of Classification Search ............ 235/462.04, 235/462.09
See application file for complete search history.

(56) References Cited

U.S. PATENT DOCUMENTS

| | | | |
|---|---|---|---|
| 5,486,686 A | 1/1996 | Zdybel et al. | |
| 5,734,800 A | 3/1998 | Herbert et al. | |
| 5,862,270 A | 1/1999 | Lopresti et al. | |
| 6,082,619 A | 7/2000 | Ma et al. | |
| 6,115,508 A | 9/2000 | Lopresti et al. | |
| 6,418,244 B2 | 7/2002 | Zhou et al. | |
| 6,567,530 B1 | 5/2003 | Keronen et al. | |
| 6,674,456 B2 | 1/2004 | Miyazaki | |
| 7,020,327 B2 | 3/2006 | Tack-don et al. | |
| 7,032,823 B2 * | 4/2006 | Nojiri | 235/462.09 |
| 7,118,041 B2 * | 10/2006 | Taylor | 235/462.09 |

* cited by examiner

*Primary Examiner*—Ahshik Kim
(74) *Attorney, Agent, or Firm*—Finnegan, Henderson, Farabow, Garrett & Dunner LLP (57) ABSTRACT

A color barcode can record much more amount of information than black white barcode. However, the problem of the color barcode is that it is easy to lose integrity or authenticity in printing and copy generation. This invention provides an apparatus and a method to keep the integrity or authenticity of the color barcode. Such is accomplished by the color reference portion of the color barcode including reference color tiles filled with colors which are used in a data portion of the color barcode and an apparatus and a method for producing, reproducing and reading such color barcode.

10 Claims, 4 Drawing Sheets

COLOR BARCODE PRODUCING METHOD AND APPARATUS, COLOR BARCODE READING METHOD AND APPARATUS AND COLOR BARCODE REPRODUCING METHOD AND APPARATUS

BACKGROUND OF THE INVENTION

The present invention relates to a color barcode producing method and apparatus, a color barcode reading method and apparatus and a color barcode reproducing method and apparatus.

A black and white barcode is very widely used for recording digital information which is readable by an apparatus in a small space on a printed matter. However, such black and white barcode has some problems. One of the problems is that it is difficult to record information including large data such as a long document or a picture.

Recently, to solve such problem, a color barcode using several colors is developed. The color barcode can record much more information than the black and white barcode because while the black and white barcode records information by binary recording, the color barcode using several colors can record information by multivalued recording.

However, even if user uses the color barcode, there are some problems yet. One of the problems is that the color barcode is easy to loss its integrity and authenticity in printing and copy generation due to i) different color management system of different apparatus, ii) different printer, iii) unstable color characteristic of printer itself, iv) scanner precision, v) degradation of color on a printed matter with time and vi) degradation in copy generation, and so on.

SUMMARY OF THE INVENTION

With a background stated above, an object of the invention is to provide a method or an apparatus which is able to maintain integrity and authenticity of the color barcode in printing and copy generation.

In order to achieve the above object, according to one aspect of the present invention, a method for producing a color barcode comprises a producing step which produces a color reference portion. The color reference portion is a part of the color barcode and including reference color tiles filled with colors which are used in a data portion of the color barcode. The method for producing the color barcode further comprises an encrypting step which encrypts data and a producing step which produces the data portion according to the result of the encrypting step of the data. The data portion is a part of the color barcode, includes the several color tiles in which colors filling in the color reference tiles of the color reference portion are assigned and represents the data. Further, the method for producing the color barcode comprises a printing step which prints the color barcode including the color reference portion and the data portion with the colors according to the results of the producing step of the color reference portion and the producing step of the data portion.

DETAILED DESCRIPTION OF THE PREFERRED EMBODIMENT

In the following, the detailed description and some of the embodiments of this invention will be explained, referring to the drawings.

Figure 1:
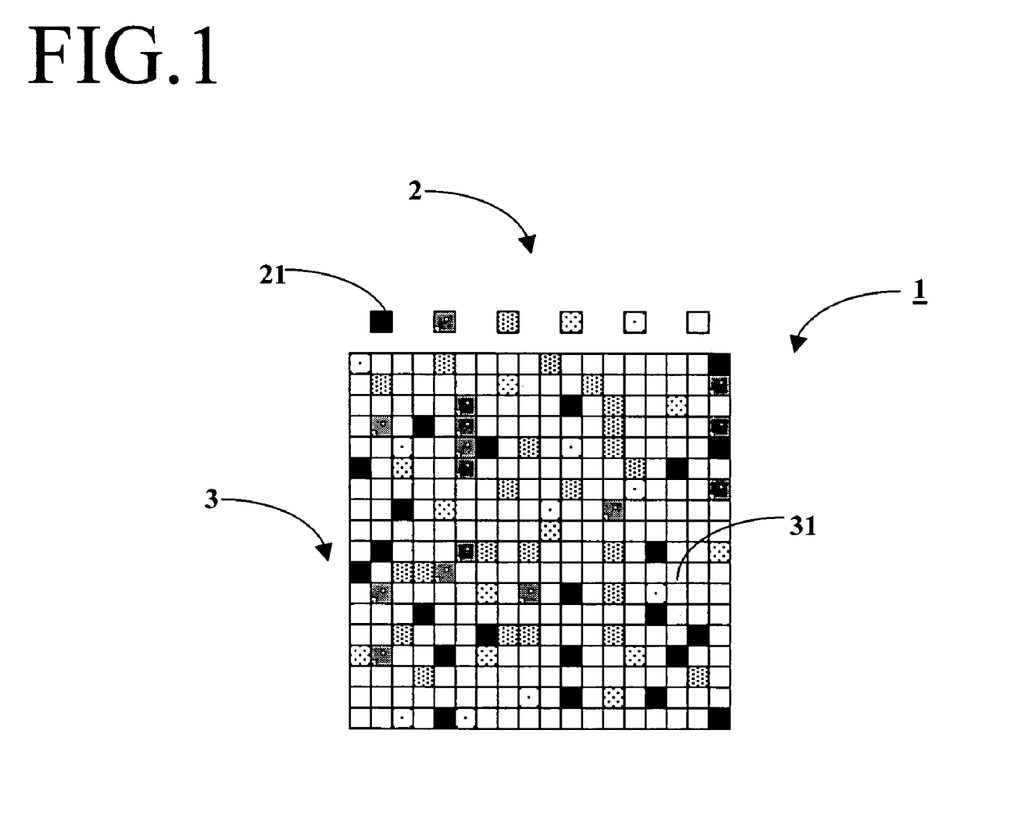
FIG. 1 is a view of a color barcode as one of embodiment of the present invention.

As shown in FIG. 1, a color barcode 1 comprises a color reference portion 2 including several reference color tiles 21 and a data portion 3 including several color tiles 31.

The data portion 3 is a part of the color barcode 1, includes the several color tiles 31 and represents a data. Several color tiles 31 include several colors. The colors filling in the color reference tiles 21 of the color reference portion 2 are assigned to the color tiles 31. Although the colors assigned to the color tiles 31 include colors other than black, white and gray, the colors assigned to the color tiles 31 also may include black, white or gray. The shape of the color tile is not limited and may be square, circle, line and so on. All of the shape of the color tile may be the same. Or, color tiles of different shape may be included in one data portion.

The data portion 3 may record information about contents of a certain document or contents of a certain picture in which the color barcode is affixed. Because the data portion 3 uses several colored color tiles 31 for recording information, the data portion 3 records information by multivalued recording, not by binary recording, and can record large volume data in small space. Any number of colors may be assigned to the color tiles. Number of colors used as the color tiles may be multiplier of two. Also, number of colors used as the color tiles may less than 100.

The data portion 3 may be two-dimensional barcode using several color tiles 31. QR Code™, PDF417, Data Matrix™, Maxi Code and so on can be used as two-dimensional barcode.

The data portion 3 is produced based on a result of an encryption of the data. For example, the content of document or picture to be affixed by the color barcode is encrypted as data. In the case, if someone amends the document or picture, the fact that the document of picture was amended can be detected by comparing the encrypted data in the data portion of the color barcode with the amended content of document or picture.

To read the data of data portion 3, the color barcode 1 on the document is scanned by a color barcode reader including decryption program, the data of the data portion 3 is decrypted and the data recorded in the data portion 3 can be obtained.

The color reference portion 2 is a part of the color barcode 1 and includes several reference color tiles 21. The reference color tiles 21 is filled with colors which are used in the color tiles 31 of the data portion 3. Number of the reference color tiles 21 in the color reference portion 2 may be decided depending on the number of colors which can be used in the color tiles 31 of the data portion 3. For example, if six colors (red, orange, blue, green, yellow and pink) are used for the color tiles 31 of the data portion 3, six reference color tiles 21 filled with each color (red, orange, blue, green, yellow and pink) may be included in the color reference portion 2. The color reference portion 2 may include the reference color tiles 21 of all colors which can be used in the color tiles 31 of the data portion 3.

The color reference portion 2 may be a header of the color barcode 1. Or, the color reference portion 2 may be a footer or other part of the color barcode 1.

The shape of the reference color tile 21 is not limited and may be square, circle, line and so on. All of the shape of the reference color tiles may be the same. Or, reference color tiles of different shape may be included in one color reference portion.

As shown in FIG. 1, the color reference portion may be located near the data portion. In this specification, the term "near" means "same as or less than 1 cm". That is, the distance between the color reference portion and the data portion may be same as or less than 1 cm. Alternatively, the color reference portion may be far from the data portion. In this specification, the term "far" means "more than 1 cm or in other page". In other words, the distance between the color reference portion and the data portion may be more than 1 cm. Further, in the case that number of pages of one document is not less than two, the color reference portion may be located on the page which is different page on which the data portion is located. The color reference portion may be located on only one page of the document and the data portion may be located on the several pages of the document. Several identical color reference portions may be located at several places of one page of document, picture, paper and so on (e.g. four corners of 1 page of a document or top and bottom of 1 page of a document and the like).

The data portion or other portion of the color barcode located near the data portion may include information about where the color reference portion is or how the color reference portion is used. The portion of the data portion or the other portion including the information about where the color reference portion is or how the color reference portion is used may be black and white or grayscale barcode. The portion of the data portion or the other portion including the information about where the color reference portion is or how the color reference portion is used may be colored bar code.

The substrate on which the color barcode is printed may be paper, plastic sheet, metal sheet and so on.

EXAMPLE 1-1

Next, one example of an apparatus for producing the color barcode will be explained as follows.

A color barcode producing apparatus comprises a color reference portion producing device, a data portion producing device and a printing device.

As such color barcode producing apparatus, a color printer, such as a laser beam color printer, a thermal color printer such as a sublimation color printer or an ink jet color printer, or a color multi function printer including copying function may be used. In such embodiments, all of the color reference portion producing device, a data portion producing device and a printing device are contained in one unit.

On the other hand, as such color barcode producing apparatus, a system including several units connected with each other with or without wire, such as a system including a personal computer and a color printer which are apart and are connected with each other, may be used. The color printer may be a laser beam color printer, a thermal color printer such as a sublimation color printer or an ink jet color printer, or a color multi function printer including copying function.

Next, each element of the color barcode producing apparatus is explained as follows.

The color reference portion producing device of the color barcode producing apparatus produces the color reference portion of the color barcode. As the color reference portion producing device, in the case that the color barcode producing apparatus is a color printer or a color multifunction printer, an IC (integrated circuit) or a CPU (central processing unit) may be comprised, if necessary in combination with a software. As the color reference portion producing device, in the case that the color barcode producing apparatus is a system including a computer and a color printer or a color multifunction printer apart, an IC or a CPU of the computer may be comprised, if necessary in combination with a software.

The data portion producing device of the color barcode producing apparatus encrypts data which will be recorded into the color barcode and produces the data portion according to the result of the color reference portion producing device and the result of the encryption of the data. As the data portion producing device, in the case that the color barcode producing apparatus is a color printer or a color multifunction printer, an IC or a CPU of the color printer or the color multifunction printer may be comprised, if necessary in combination with a software. As the data portion producing device, in the case that the color barcode producing apparatus is a system including a computer and a color printer apart or a color multifunction printer, an IC or a CPU of the computer may be comprised, if necessary in combination with a software.

The printing device of the color barcode producing apparatus prints the color barcode including the color reference portion and the data portion according to the results of the producing step of the color reference portion producing device and the producing step of the data portion producing device. As the printing device, in the case that the color barcode producing apparatus is a color printer or a color multifunction printer, a printing portion of the color printer or the color multifunction printer may be comprised. As the printing device, in the case that the color barcode producing apparatus is a system including a computer and a color printer or a color multifunction printer apart, the color printer or the color multifunction printer may be comprised.

The color barcode producing apparatus may further comprise a scanning device. The scanning device scans the document or picture to be affixed with the color barcode. And the data portion producing device produces the data portion based on the data scanned by the scanning device. As the scanning device, in the case that the color barcode producing apparatus is a color multifunction printer, a scanning portion of the color multifunction printer may be comprised. As the scanning device, in the case that the color barcode producing apparatus is a system including a computer, a flat bed scanner and a color printer apart, the flat bed scanner may be comprised.

The color barcode producing apparatus may further comprise a deciding device. The deciding device decides colors used for the color reference portion. As the deciding device, in the case that the color barcode producing apparatus is a color printer or a color multifunction printer, an IC or a CPU of the color printer or the color multifunction printer may be comprised, if necessary in combination with a software. As the deciding device, in the case that the color barcode producing apparatus is a system including a computer and a color printer apart, an IC or a CPU of the computer may be comprised, if necessary in combination with a software.

The deciding device may decide the number of the colors used for the color reference portion at random. Or, the deciding device may decide the number of the colors used for the color reference portion depending on the volume of data which is to be converted to data portion. That is, if the volume of data is large, the number of colors assigned to color tiles is many. On the contrary, if the volume of data is small, the number of colors may be a few. Or, the number of colors may be always fixed.

After the deciding device decides the number of the colors used for the color reference portion, the deciding device may decide the colors used for the color reference portion. The deciding device may decide the colors used for the color reference portion at random according to the decided number of colors. Or, the deciding device may decide the colors used for the color reference portion as follows.

The data of the document on which the color barcode is affixed, which may be the digital data being a base of the data portion, is analyzed. Then, the shade or tone of colors of the data of the document is decided, and the colors used for the color reference portion are decided by the deciding device so as that the colors used for the color reference portion are harmonious with the colors of the document affixing the color barcode.

Using the color barcode producing apparatus of this example, the color barcode is produced as follows.

A method for producing a color barcode comprises a color reference portion producing step which produces a color reference portion, an encrypting step which encrypts data, a data portion producing step which produces the data portion according to the result of the encrypting step of the data, and a printing step which prints the color barcode including the color reference portion and the data portion with the colors according to the results of the color reference portion producing step and the data portion producing step. Further, the method for producing the color barcode of this example further comprises a deciding step which decides colors used for the color reference portion before the color reference portion producing step.

In the following, the detailed description of one of examples of the above method will be explained, referring to FIG. 2.

Figure 2:
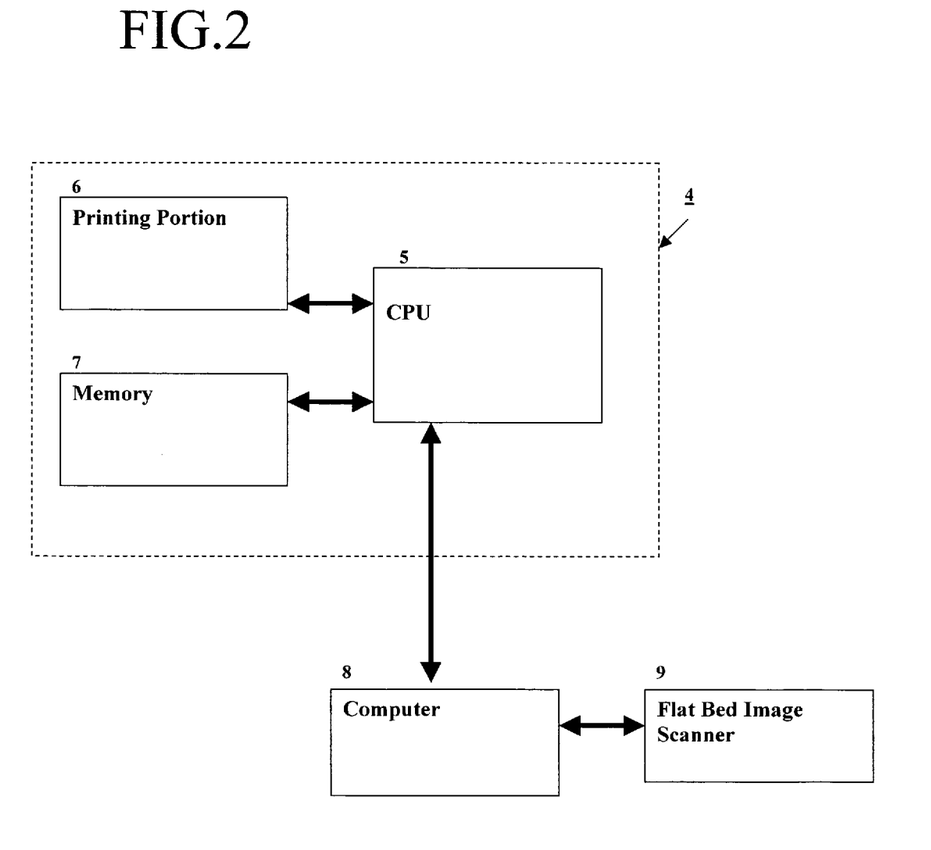
FIG. 2 is a block diagram of a color barcode producing apparatus as one of embodiment of the present invention.

In FIG. 2, a color printer 4 is shown as the color barcode producing apparatus for the above method. In this embodiment, a computer 8 is connected with the color printer 4. The computer 8 is connected with a flat bed image scanner 9. That is, the color barcode producing apparatus of this example does not comprise the scanning device.

At first, a document or a picture including information which is to be recorded in the data portion of the color barcode is scanned by the flat bed image scanner 9 and is changed into a digital data which is a base of the data portion 3 of the color barcode 1. Alternatively, to get a digital data which is a base of the data portion 3, some digital data, such as a data recorded in CD-ROM, DVD-ROM or a hard disk or a digital data sent via a network, may be read by the computer 8.

Next, colors filling in the reference color tiles 21 of the color reference portion 2 are decided. That is, colors to be assigned to the color tiles 31 of the data portion 3 are decided. In this example, number of colors filling in the reference color tiles 21 is always fixed as six. To decide the colors, the data of the document, which may be the digital data being a base of the data portion, is analyzed by the computer 8 or the CPU 5 of the color printer 4. Then, the shade or tone of colors of the data of the document is decided by the computer 8 or the CPU 5 of the color printer 4, and the colors to fill in the reference color tiles 21 and to be assigned to the color tiles 31 are decided by the computer 8 or the CPU 5 of the color printer 4, which is the deciding device, so as that the colors to fill in the reference color tiles 21 and to be assigned to the color tiles 31 are harmonious with the colors of the document affixing the color barcode. The color may be decided by deciding the defined color value such as Pantone™ color, LAB value (La*b* value or Lab value), HSV and so on. Pantone™ color is color of definition defined by Pantone, Inc as of July, 2004.

In this example, six colors (red (Pantone™ 485C), orange (Pantone™ 715C), blue (Pantone™ 285C), green (Pantone™ 340C), yellow (Pantone™ 102C) and pink (Pantone™ 672C)) are decided by the procedure stated as above. Therefore, it is decided that the color reference portion includes six reference color tiles 21 of red, orange, blue, green, yellow and pink.

Then, the color reference portion 2 of the color barcode 1 is produced by the CPU 5 as the color reference portion producing device according to the result of the decision of the colors filling in the reference color tiles 2. CPU 5 may produce the color reference portion by deciding the position, size and/or shape of each reference color tiles 21 and assigning the decided color. In this example, the color reference portion 2 is located as a header of the color barcode 1 and includes six reference color tiles 21 of which shape is same size square.

Also, the digital data of the document which is a base of the data portion 3 is encrypted by the CPU 5 as the data portion producing device. To encrypt, DES or RC4 etc. encryption method may be used.

Then, the data portion 3 of the color barcode 1 is produced by the CPU 5 as the data portion producing device according to the decision of colors to fill in the reference color tiles. The data portion 3 is a second-dimensional color barcode comprising six kind of colors (red (Pantone™ 485C), orange (Pantone™ 715C), blue (Pantone™ 285C), green (Pantone™ 340C), yellow (Pantone™ 102C) and pink (Pantone™ 672C)) of color tiles 31. To produce the data portion, a software for producing barcode may be used. The color reference portion and the data portion may be produced separately and be combined later to produce the color barcode comprising the data portion and the color reference portion.

The encrypting step and the data portion producing step may be done before, after or at the same time with the color reference portion producing step.

In the case that the data portion is located far from the color reference portion, CPU 5 as the data portion producing device may produce the data portion so that the data portion includes the information where the color reference portion is or how the color reference portion is used.

By producing the color reference portion and the data portion, the color barcode is produced.

After that, the color barcode 1 including the color reference portion 2 and the data portion 3 is printed on the paper by a printing portion 6, which is the printing device, of the color printer 4 with the colors according to the result of the color reference portion producing step and the result of the data portion producing step. That is to say, the color barcode 1 is printed so as that the color of the data portion includes six colors (red (Pantone™ 485C), orange (Pantone™ 715C), blue (Pantone™ 285C), green (Pantone™ 340C), yellow (Pantone™ 102C) and pink (Pantone™ 672C)) and the color reference portion includes six reference color tiles (red (Pantone™ 485C), orange (Pantone™ 715C), blue (Pantone™ 285C), green (Pantone™ 340C), yellow (Pantone™ 102C) and pink (Pantone™ 672C)). If the colors are decided by the defined color value as this example, the color barcode is printed according the decided defined color value. By doing such, the color barcode as shown in FIG. 1 is produced on the paper.

The color barcode may be affixed not only to the paper, but also to the digital data of the document or the picture as the digital data of the color barcode.

EXAMPLE 1-2

Next, the other example of an apparatus for producing the color barcode will be explained as follows.

The color barcode producing apparatus of this example is almost similar with the color barcode producing apparatus of Example 1-1. The description about what is similar to the Example 1-1 is omitted.

The color barcode producing apparatus of this example further comprises a storing device. The storing device stores date of the color reference portion. As the storing device, in the case that the color barcode producing apparatus is a color printer or a color multifunction printer, a memory or a hard disk of the color printer or the color multifunction printer may be comprised. As the storing device, in the case that the color barcode producing apparatus is a system including a computer and a color printer apart, a memory or a hard disk of the computer or the color printer, or an external and/or a removable information storing device, such as a CD and/or DVD-ROM and the reproducing device for them of the computer or the color printer may be comprised.

The data of color reference portion stored in the storing device includes information about what colors are used for the reference color tiles or data of the reference color tiles themselves.

The storing device may store only one combination pattern of colors which are assigned to the reference color tiles or reference color tiles themselves. On the other hand, the storing device may store several combination patterns of colors which are assigned to the reference color tiles or reference color tiles themselves.

In the case that the storing device stores several combination patterns, an user may be able to choose the color used for the reference color tiles by selecting the data among the several combination patterns.

Therefore, the color barcode producing apparatus may comprise a selecting device in order to choose the data of the reference color tile among the several data stored in the storing device, such as an input button of the color printer or a keyboard of the computer.

Or, in order to choose the colors of the reference color tiles automatically, the color barcode producing apparatus may further comprise the deciding device. At first, the deciding device may decide the number of the colors used for the color reference portion at random. Or, the deciding device may decide the number of the colors used for the color reference portion depending on the volume of data which is to be converted to data portion. That is, if the volume of data is large, the number of colors assigned to reference color tiles is many. On the contrary, if the volume of data is small, the number of colors may be a few. Or, the number of colors may be always fixed.

After the deciding device decides the number of the colors used for the color reference portion, the deciding device may decide the colors used for the color reference portion among the data of the colors or the reference color tiles stored in the storing device. The deciding device may decide the colors used for the color reference portion by selecting at random according to the decided number of colors and the data stored in the storing device. Or, the deciding device may decide the colors used for the color reference portion as follows.

The data of the document on which the color barcode is affixed, which may be the digital data being a base of the data portion, is analyzed. Then, the shade or tone of colors of the data of the document is decided, and the colors used for the color reference portion are decided by the deciding device among the data of the colors or the reference color tiles stored in the storing device so as that the colors used for the color reference portion are the most harmonious with the colors of the document affixing the color barcode.

Regarding the color reference portion producing device and the data portion producing device, it is similar to that of the Example 1-1 except that the color reference portion producing device and the data portion producing device may produce the color reference portion and the data portion according to the data stored in the storing device.

Regarding the printing device, it is similar to that of the Example 1-1 except that the printing device may print the color barcode according to the data stored in the storing device.

Using the color barcode producing apparatus of this example, the color barcode is produced as follows.

A method for producing a color barcode comprises a color reference portion producing step which produces a color reference portion, an encrypting step which encrypts data, a data portion producing step which produces the data portion according to the result of the encrypting step of the data, and a printing step which prints the color barcode including the color reference portion and the data portion with the colors according to the results of the color reference portion producing step and the data portion producing step.

Further, the method for producing the color barcode of this example further comprises a storing step which stores data of the color reference portion beforehand. In the color reference portion producing step, the color reference portion is produced on the basis of the data of the color reference portion stored.

In the following, the detailed description of one of examples of the above method will be explained, referring to FIG. 2.

In FIG. 2, a color printer 4 is shown as the color barcode producing apparatus for the above method. In this embodiment, a computer 8 is connected with the color printer 4. The computer 8 is connecter with a flat bed image scanner 9. That is, the color barcode producing apparatus of this example does not comprise the scanning device.

At first, a document or a picture including information which is to be recorded in the data portion of the color barcode is scanned by the flat bed image scanner 9 and is changed into a digital data which is a base of the data portion 3 of the color barcode 1. Alternatively, to get a digital data which is a base of the data portion 3, some digital data, such as a data recorded in CD-ROM, DVD-ROM or a hard disk or a digital data sent via a network, may be reproduced by the computer 8.

Next, in the case that a memory 7 as the storing device stores several data of color reference portion, colors to be assigned to the reference color tiles 21 are decided among the several data. To select the data, the data of the document, which may be the digital data being a base of the data portion, is analyzed by the computer 8 or the CPU 5 of the color printer 4. Then, the shade or tone of colors of the data of the document is decided by the computer 8 or the CPU 5 of the color printer 4, and one of the data representing a combination pattern of colors of reference color tiles is selected among the several data stored in the memory 7 by the CPU 5 as the deciding device so as that the colors of the reference color tiles are the most harmonious with the colors of the document affixing the color barcode among the data stored in the memory 7.

Or, as the other way, user can choose the color combination pattern as the data of the reference color tiles among several data by an input button (not disclosed in FIG. 2) of the color printer 4 as the selecting device.

In the case that the memory 7 as the storing device stores only one color combination pattern as the data of the color reference portion, the process described in the previous two paragraphs are omitted.

By selecting the colors of the reference color tiles, the colors assigned to the color tiles 31 are decided. In this example, number of colors is always fixed as six and six colors (red (Pantone™ 485C), orange (Pantone™ 715C), blue (Pantone™ 285C), green (Pantone™ 340C), yellow (Pantone™ 102C) and pink (Pantone™ 672C)) are selected by the procedure stated as above. Therefore, it is decided that the color reference portion includes six reference color tiles 21 of red, orange, blue, green, yellow and pink.

Then, the color reference portion 2 of the color barcode 1 is produced by the CPU 5 as the color reference portion producing device according to the result of the selection of the colors filling in the reference color tiles 21 among the data stored in the memory 7. CPU 5 may produce the color reference portion by deciding the position, size and/or shape of each reference color tiles 21 and assigning the selected color. In this example, the color reference portion 2 is located as a header of the color barcode 1 and includes six reference color tiles 21 of which shape is same size square.

Also, the digital data of the document which is a base of the data portion 3 is encrypted by the CPU 5 as the data portion producing device. To encrypt, DES or RC4 etc. encryption method may be used.

Then, the data portion 3 of the color barcode 1 is produced by the CPU 5 as the data portion producing device according to the selection of colors to fill in the reference color tiles. The data portion 3 is a second-dimensional color barcode comprising six kind of colors (red (Pantone™ 485C), orange (Pantone™ 715C), blue (Pantone™ 285C), green (Pantone™ 340C), yellow (Pantone™ 102C) and pink (Pantone™ 672C)) of color tiles 31. To produce the data portion, a software for producing barcode may be used. The color reference portion and the data portion may be produced separately and be combined later to produce the color barcode comprising the data portion and the color reference portion.

In the case that the data portion is located far from the color reference portion, CPU 5 as the data portion producing device may produce the data portion so that the data portion includes the information where the color reference portion is or how the color reference portion is used.

The encrypting step and the data portion producing step may be done before, after or at the same time with the color reference portion producing step.

By producing the color reference portion and the data portion, the color barcode is produced.

After that, the color barcode 1 including the color reference portion 2 and the data portion 3 is printed on the paper by a printing portion 6, which is the printing device, of the color printer 4 with the colors according to the result of the color reference portion producing step and the result of the data portion producing step. That is to say, the color barcode 1 is printed so as that the color of the data portion includes six colors (red (Pantone™ 485C), orange (Pantone™ 715C), blue (Pantone™ 285C), green (Pantone™ 340C), yellow (Pantone™ 102C) and pink (Pantone™ 672C)) and the color reference portion includes six reference color tiles (red (Pantone™ 485C), orange (Pantone™ 715C), blue (Pantone™ 285C), green (Pantone™ 340C), yellow (Pantone™ 102C) and pink (Pantone™ 672C)). If the colors are decided by the defined color value as this example, the color barcode is printed according the decided defined color value. By doing such, the color barcode as shown in FIG. 1 is produced on the paper.

The color barcode may be affixed not only to the paper, but also to the digital data of the document or the picture as the digital data of the color barcode.

EXAMPLE 2-1

In the examples 1-1 and 1-2, the examples of the apparatus and method of producing the color barcode are explained. In the following, the example of an apparatus and a method for reproducing the color barcode will be explained.

A color barcode reproducing apparatus comprises a reference color information storing device, a scanning device, a relating device and a printing device.

As such color barcode reproducing apparatus, a color copying machine or a color multi function printer including copying function may be used. In such embodiment, all of the reference color information storing device, the scanning device, the relating device and the printing device are contained in one unit.

On the other hand, as such color barcode reproducing apparatus, a system including several units connected with each other with or without wire, such as a system including a personal computer, an image scanner and a color printer which are apart and are connected with each other, may be used. The color printer may be a laser beam color printer, a thermal color printer such as a sublimation color printer or an ink jet color printer, or a color multi function printer including copying function.

Next, each element of the color barcode reproducing apparatus is explained as follows.

The scanning device scans the color reference portion of the color barcode and the data portion of the color barcode. As the scanning device, in the case that the color barcode reproducing apparatus is the color copying machine or the color multi function printer, a scanning portion of the color copying machine or the multi function color printer may be comprised. As the scanning device, in the case that the color barcode reproducing apparatus is a system including a computer, an image scanner and a color printer apart, an image scanner such as a flat bed scanner may be comprised.

The reference color information storing device stores a reference color information beforehand.

The reference color information includes information about what colors should be filled in reference color tiles of the color reference portion. The information about what colors should be filled in reference color tiles may be expressed with defined color value, such as Pantone™ color, LAB value (La*b* value or Lab value), HSV and so on.

In this example, the reference color information includes information about where each of the reference color tiles should be located and what color should be filled in each of the reference color tiles. For example, the reference color information includes information, which six reference color tiles are aligned at 5 mm above the data portion at right down of the document and the color of leftmost reference color tile is red (Pantone™ 485C), the color of next right reference color tile is orange (Pantone™ 715C), the color of next right reference color tile is blue (Pantone™ 285C), the color of next right reference color tile is green (Pantone™ 340C), the color of next right reference color tile is yellow (Pantone™ 102C) and the color of rightmost reference color tile is pink (Pantone™ 672C).

As the reference color information storing device, in the case that the color barcode reproducing apparatus is a color copying machine or a color multifunction printer, a memory or a hard disk or an external and/or a removable information storing device, such as a CD and/or DVD-ROM and the reproducing device for them of the color copying machine or the color multifunction printer may be comprised. As the reference color information storing device, in the case that the color barcode reproducing apparatus is a system including a computer and an image scanner and a color printer apart, a memory, a hard disk of the computer or the color printer, or an external and/or a removable information storing device, such as a CD and/or DVD-ROM and the reproducing device for them of the computer or the color printer may be comprised.

The relating device relates each color of the reference color information stored in the reference color information storing device to each color of the reference color tile of the color reference portion scanned by the scanning device. As the relating device, in the case that the color barcode reproducing apparatus is the color copying machine or the color multi function printer, an IC or a CPU of the color copying machine or the color multi function printer may be comprised, if necessary in combination with a software. As the relating device, in the case that the color barcode reproducing apparatus is a system including a computer, an image scanner and a color printer apart, an IC or a CPU of the computer or the image scanner may be comprised, if necessary in combination with a software.

The printing device prints the color barcode including the color reference portion and the data portion with the color according to the result of the scanning device and the relating device. As the printing device, in the case that the color barcode reproducing apparatus is the color copying machine or the color multi function printer, a printing portion of the color copying machine or the multi function color printer may be comprised. As the printing device, in the case that the color barcode reproducing apparatus is a system including a computer, an image scanner and a color printer apart, the color printer may be comprised.

The color barcode reproducing apparatus may further comprises the retrieving device. The retrieving device retrieves the information of the color barcode by decrypting the data obtained from the data portion of the color barcode. As the retrieving device, in the case that the color barcode reproducing apparatus is the color copying machine or the color multi function printer, an IC or a CPU of the color copying machine or the color multi function printer may be comprised, if necessary in combination with a software. As the retrieving device, in the case that the color barcode reproducing apparatus is a system including a computer, an image scanner and a color printer apart, an IC or a CPU of the computer or the image scanner may be comprised, if necessary in combination with a software The color barcode reproducing apparatus may further comprise a color barcode data storing device which stores a data of the color barcode scanned by the scanning device, a data obtained from a result of the relating step by the relating device or a data obtained from a result of the retrieving step of the retrieving device. As the color barcode data storing device, in the case that the color barcode reproducing apparatus is the color copying machine or the color multi function printer, a memory of the color copying machine or the multi function color printer may be comprised. As the color barcode data storing device, in the case that the color barcode reproducing apparatus is a system including a computer, an image scanner and a color printer apart, a memory of the computer or the color printer, a hard disk of the computer, or a external and/or a removable information storing device, such as a CD and/or DVD-ROM and the reproducing device for them of the computer may be comprised.

Using the color barcode reproducing apparatus of this example, the color barcode is reproduced as follows.

A method for reproducing a color barcode comprises a storing step which stores the reference color information, a scanning step which scans the color reference portion including the reference color tiles, a relating step which relates each color of the reference color information stored to each color of the reference color tile of the scanned color reference portion, a scanning step which scans the data portion and a printing step which prints the color barcode including the color reference portion and the data portion with the colors according to the results of the relating step and the scanning step of the color reference portion and the data portion.

In this example, the reference color information includes information about where each of the reference color tiles should be located and what color should be filled in each of the reference color tiles. In the relating step, each color of the reference color information stored is related to each color of the reference color tile of the scanned color reference portion on the basis of the information about where each of the reference color tiles should be located and what color should be filled in each of the reference color tiles.

In the following, the detailed description of one of examples of the above method will be explained, referring to FIG. 3.

Figure 3:
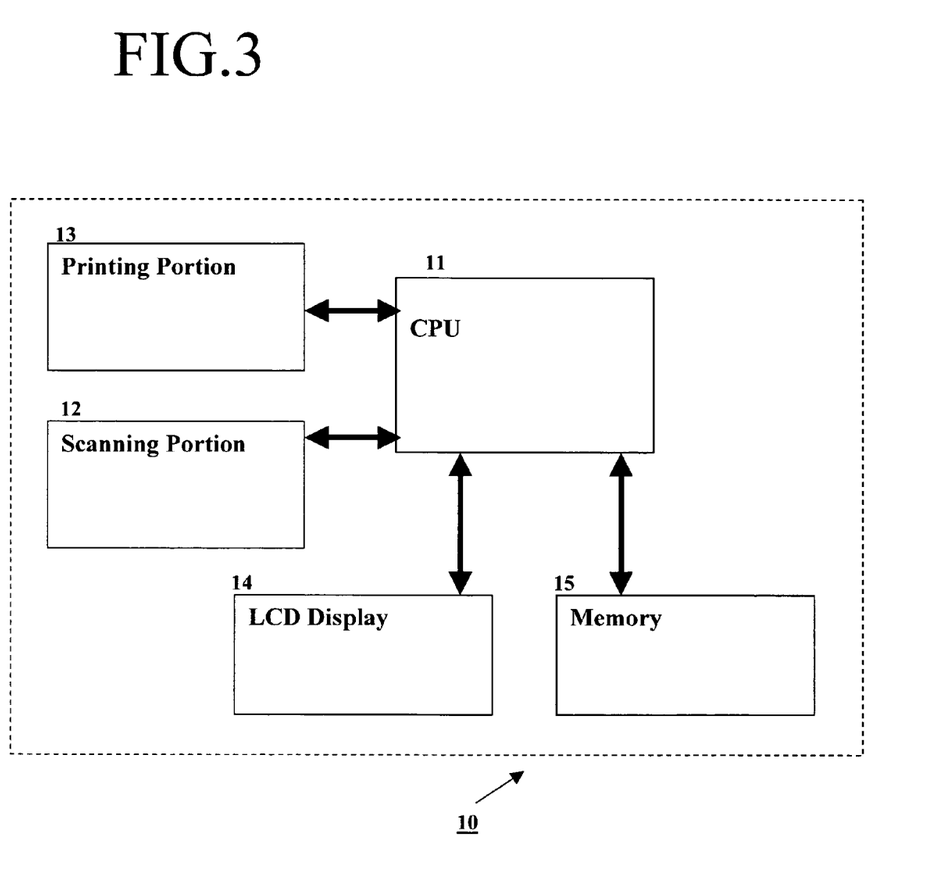
FIG. 3 is a block diagram of a color barcode reproducing apparatus as one of embodiment of the present invention.

In FIG. 3, a color multifunction printer 10 including copying function is shown as the color barcode reproducing apparatus for the above method.

In advance, the reference color information is stored in a memory 15 as the reference color information storing device. In this example, the reference color information includes information, which six reference color tiles are aligned at 5 mm above the data portion at right down of the document and the color of leftmost reference color tile is red (Pantone™ 485C), the color of next right reference color tile is orange (Pantone™ 715C), the color of next right reference color tile is blue (Pantone™ 285C), the color of next right reference color tile is green (Pantone™ 340C), the color of next right reference color tile is yellow (Pantone™ 102C) and the color of rightmost reference color tile is pink (Pantone™ 672C).

A paper, a sheet, a document or a book etc. affixing the color barcode 1 comprising the color reference portion 2 comprising six reference color tiles 21 and the data portion 3 comprising several color tiles 31 is scanned by the scanning portion 12, which is the scanning device, of the color multifunction printer 10 and the color barcode is changed into a digital data. Alternatively, to get a digital data of the color barcode, some digital data, such as a data recorded in CD-ROM, DVD-ROM or a hard disk or a digital data sent via a network, may be read by a computer (not disclosed in FIG. 3) connected with the color multifunction printer 10 and sent from the computer to the multifunction printer 10. As stated in the above, usually the color information portion scanning step and the data portion scanning step is done simultaneously.

Next, in the relating step, data of each of the reference color tile 21 is extracted from the data of the scanned document and each color used in the reference color tiles 21 is retrieved and analyzed. For example, as a result of analyzing scanned reference color tiles 21 by CPU 11, it is recognized that the color of leftmost scanned reference color tile is red (Pantone™ 485C), the color of next right scanned reference color tile is purple (Pantone™ 512C), the color of next right scanned reference color tile is blue (Pantone™ 2925C), the color of next right scanned reference color tile is green (Pantone™

340C), the color of next right scanned reference color tile is yellow (Pantone™ 102C) and the color of rightmost scanned reference color tile is pink (Pantone™ 672C).

Each color of the reference color information stored is related by CPU 11 as the relating device to each color of the reference color tile 21 of the scanned color reference portion 2 on the basis of the information about where each of the reference color tiles should be located and what color should be filled in each of the reference color tiles.

The color of the reference color information stored in the memory 15 for the leftmost reference color tile is red (Pantone™ 485C). And the color of the scanned leftmost reference color tile is red (Pantone™ 485C). Therefore, the red (Pantone™ 485C) of the reference color information is related to the red (Pantone™ 485C) of the scanned reference color tile by CPU 11. Next, The color of the reference color information stored in the memory 15 for the next right reference color tile is orange (Pantone™ 715C). And the color of the scanned next right reference color tile is purple (Pantone™ 512C). Therefore, the orange (Pantone™ 715C) of the reference color information is related to the purple (Pantone™ 512C) of the scanned reference color tile by CPU 11 even though the orange and the purple are different colors. As stated the above, the relating step is repeated. The result of the relating step of this example is as described in Table 1. The result of the relating step is recorded in the memory 15.

TABLE 1

| No. | Location of the reference color tile | The color of the reference color information | The color of the scanned reference color tile |
|---|---|---|---|
| 1 | Leftmost | red (Pantone ™ 485C) | red (Pantone ™ 485C) |
| 2 | Next right to 1 | orange (Pantone ™ 485C) | purple (Pantone ™ 512C) |
| 3 | Next right to 2 | blue (Pantone ™ 285C) | blue (Pantone ™ 2925C) |
| 4 | Next right to 3 | green (Pantone ™ 340C) | green (Pantone ™ 340C) |
| 5 | Next right to 4 | yellow (Pantone ™ 102C) | yellow (Pantone ™ 102C) |
| 6 | Rightmost | pink (Pantone ™ 672C) | pink (Pantone ™ 672C) |

As a result of the relating step, each color of the scanned reference color tiles is recognized by CPU 11 as each color of the reference color information stored in the memory 15. That is to say, purple (Pantone™ 512C) of the scanned reference color tile is recognized as orange (Pantone™ 485C). Blue (Pantone™ 2925C) of the scanned reference color tile is recognized as blue (Pantone™ 285C).

The color of the color tiles of the data portion is recognized on the basis of the result of the relating step. That is to say, scanned purple (Pantone™ 512C) color tiles of the data portion is recognized as orange (Pantone™ 485C) color tiles. Blue (Pantone™ 2925C) color tiles of the data portion is recognized as blue (Pantone™ 285C) color tiles. Red (Pantone™ 485C) color tiles of the data portion is recognized as red (Pantone™ 485C) color tiles. In other words, by relating step, the color of the scanned color barcode may be amended on the basis of the reference color information.

After the relating step, according to the result of the relating step, the Pantone™ colors used for printing the color barcode are decided. Then, according to the decided colors, the color barcode 1 comprising the color reference portion 2 and the data portion 3 is printed on the paper by a printing portion 13, which is the printing device, of the color multifunction printer 10 so that the color of the reference color tile 21 accords with the color of the reference color information and the color of the color tiles 31 also accords with the color of the reference color information.

In this example, the scanned color barcode includes the reference color tiles and the color tiles of red (Pantone™ 485C), purple (Pantone™ 512C), blue (Pantone™ 2925C), green (Pantone™ 340C), yellow (Pantone™ 102C) and pink (Pantone™ 672C). As a result of reproducing, the color barcode including the reference color tiles and the color tiles of red (Pantone™ 485C), orange (Pantone™ 715C), blue (Pantone™ 285C), green (Pantone™ 340C), yellow (Pantone™ 102C) and pink (Pantone™ 672C) is printed. Orange (Pantone™ 715C) and blue (Pantone™ 285C) are printed in the reference color tiles and the color tiles corresponding to the reference color tiles and the color tiles of which color is purple (Pantone™ 512C) and blue (Pantone™ 2925C) in the scanned original color barcode.

By doing such, integrity and authenticity of the color barcode can be maintained even if the color barcode is copied or reprinted.

The color barcode may be affixed not only to the paper, but also to the digital data of the document or the picture as the digital data of the color barcode.

Incidentally, in the case that the color reference portion is located far from the data portion, the data portion or other portion of the color barcode which is located near the data portion may include information about where the color reference portion is. In this case, the method for reproducing the color barcode further comprises retrieving step which retrieves the data by decrypting the scanned data portion or the scanned other portion.

In the retrieving step, a data of the data portion or the other portion is extracted from the scanned digital data. And the data of the data portion or the other portion is decrypted by CPU 11 of the color multifunction printer 10 as the retrieving device in order to obtain the information where the color reference portion is. For example, the information, which the color reference portion is at upper right of the 1 page of the document. To decrypt, DES or RCS etc. decryption method may be used. By this step, the information about where the color reference portion is can be retrieved.

Next, according to the information where the color reference portion is, the color reference portion at the upper right of the 1 page of the document is extracted from the scanned digital data and is obtained. This extraction is included in the scanning step for the color reference portion.

That is to say, in this case, the scanning step for the color reference portion is conducted after the completion of the scanning step for the data portion or the other portion and retrieving step for the data portion or the other portion.

Instead of or in addition to the information about where the color reference portion is, the information about what shape or pattern the color reference portion is may be recorded in the data portion or the other portion and used.

Incidentally, the data portion or the other portion of the color barcode may include information about how the color reference portion is used. In the retrieving step for the data portion or the other portion, the information about how the color reference portion is used is retrieved. For example, in the case that several identical color reference portions are located at four corners of 1 page of a document, the information about how the color reference portion is used may include the information that the average of the four color values of the reference color tiles of four color reference portion can be used as the color value of the reference color tiles. And the relating step is conducted on the basis of the average of color value of the four color reference portion.

And, the relating step is conducted on the basis of the information about how the color reference portion is used.

EXAMPLE 2-2

Next, the other example of an apparatus and a method for reproducing the color barcode will be explained as follows.

The color barcode reproducing apparatus of this example is almost similar with the color barcode reproducing apparatus of Example 2-1. The description about what is similar to the Example 2-1 is omitted.

In this example, the reference color information includes information about where the color reference portion should be located, what colors should be filled in the reference color tiles and a permissible range of each color of the reference color tiles of the scanned color reference portion. Instead of or in addition to information about where the color reference portion should be located, information about what shape or pattern the color reference portion should be may be included in the reference color information.

The permissible range may be defined by a range of brightness of color or a range of chroma saturation etc., or several specific values of defined color value.

For example, the reference color information includes information, which the color reference portion is located at 5 mm above the data portion at right down of the document and red (Pantone™ 485C), orange (Pantone™ 715C), blue (Pantone™ 285C), green (Pantone™ 340C), yellow (Pantone™ 102C) and pink (Pantone™ 672C) are used for the reference color tiles and the color tiles and a permissible range of each color of the reference color tile. However, difference from Example 2-1, the reference color information does not include information about what reference color tile should be filled with what color. In this example, the permissible range for red are Pantone™ 484C, Pantone™ 486C, Pantone™ 1788C, Pantone™ 1795C, Pantone™ 1797C, Pantone™ 186C, Pantone™ 193C, Pantone™ 1935C. The permissible range for each color is described in Table 2. Such permissible range is recorded in the memory 15 beforehand.

In a method for reproducing a color barcode of this example, each color of the reference color information stored is related to each color of the color of the reference color tile of the scanned color reference portion on the basis of a result of an analysis whether each of the colors of the color reference tiles is within the permissible range or not.

In this relating step, the color reference portion is extracted by CPU 11 from the data of the scanned document according to the information where the color reference portion should be located. Then, the extracted color reference portion is analyzed by CPU 11.

For example, as a result of analyzing the color reference portion by CPU 11, it is recognized that there are six reference color tiles in the color reference portion and the color of leftmost scanned reference color tile is orange (Pantone™ 7408C), the color of next right scanned reference color tile is green (Pantone™ 3405C), the color of next right scanned reference color tile is blue (Pantone™ 2925C), the color of next right scanned reference color tile is red (Pantone™ 484C), the color of next right scanned reference color tile is pink (Pantone™ 672C) and the color of rightmost scanned reference color tile is yellow (Pantone™ 107C).

Next, each color of the reference color information stored in the memory 15 is related to each color of the reference color tile of the scanned color reference portion on the basis of a result of an analysis whether each of the color of the scanned color reference tiles is within the permissible range or not.

For example, as a result of the relating step, CPU 11 recognizes that the orange (Pantone™ 7408C) of the scanned reference color tile is within the permissible range of orange as described in Table 2. Therefore, the orange (Pantone™ 715C) of the reference color information stored is related to the orange (Pantone™ 7408C) of the scanned reference color tile. The green (Pantone™ 3405C) of the scanned reference color tile is within the permissible range of green as described in Table 2. Therefore, the green (Pantone™ 340C) of the reference color information stored is related to the green (Pantone™ 3405C) of the scanned reference color tiles.

TABLE 2

| Color of the reference color information | Permissible range |
| --- | --- |
| red (Pantone ™ 485C) | Pantone ™ 485C, Pantone ™ 484C, Pantone ™ 486C, Pantone ™ 1788C, Pantone ™ 1795C, Pantone ™ 1797C, Pantone ™ 186C, Pantone ™ 193C, Pantone ™ 1935C. |
| orange (Pantone ™ 715C) | Pantone ™ 715C, Pantone ™ 713C, Pantone ™ 714C, Pantone ™ 716C, Pantone ™ 717C, Pantone ™ 718C, Pantone ™ 7408C, Pantone ™ 7409C, Pantone ™ 021C. |
| blue (Pantone ™ 285C) | Pantone ™ 285C, Pantone ™ 284C, Pantone ™ 286C, Pantone ™ 2925C, Pantone ™ 2935C, Pantone ™ 2945C, Pantone ™ 299C, Pantone ™ 300C, Pantone ™ 301C. |
| green (Pantone ™ 340C) | Pantone ™ 340C, Pantone ™ 339C, Pantone ™ 341C, Pantone ™ 3395C, Pantone ™ 3405C, Pantone ™ 3415C, Pantone ™ 347C, Pantone ™ 348C, Pantone ™ 354C. |
| yellow (Pantone ™ 102C) | Pantone ™ 102C, Pantone ™ 100C, Pantone ™ 101C, Pantone ™ 102C, Pantone ™ 106C, Pantone ™ 107C, Pantone ™ 108C, Pantone ™ 113C, Pantone ™ 114C. |
| pink (Pantone ™ 672C) | Pantone ™ 672C, Pantone ™ 670C, Pantone ™ 671C, Pantone ™ 673C, Pantone ™ 674C, Pantone ™ 678C, Pantone ™ 679C, Pantone ™ 680C, Pantone ™ 686C. |

As stated the above, the relating step is repeated. The result of the relating step is shown in Table 3.

TABLE 3

| No. | Location of the reference color tile | The color of the reference color information | The color of the scanned reference color tile |
|---|---|---|---|
| 1 | Leftmost | orange (Pantone ™ 715C) | orange (Pantone ™ 7408C) |
| 2 | Next right to 1 | green (Pantone ™ 340C) | green (Pantone ™ 3405C) |
| 3 | Next right to 2 | blue (Pantone ™ 285C) | blue (Pantone ™ 2925C) |
| 4 | Next right to 3 | red (Pantone ™ 485C) | red (Pantone ™ 484C) |
| 5 | Next right to 4 | pink (Pantone ™ 672C) | pink (Pantone ™ 672C) |
| 6 | Rightmost | yellow (Pantone ™ 102C) | yellow (Pantone ™ 107C) |

If as a result of the relating step, CPU 11 recognizes that certain color of the scanned reference color tile is not within any permissible range of the reference color information, the relating step cannot be completed. In such case, a LCD display 14 of the color multifunction printer 10 displays warning message such as "this color barcode cannot be reproduced."

As a result of relating step, each color of the scanned reference color tiles 21 is recognized by CPU 11 as each color of the reference color information. That is to say, orange (Pantone™ 7408C) of the scanned reference color tile is recognized as orange (Pantone™ 715C).

The color of the color tiles of the data portion is recognized on the basis of the result of the relating step. That is to say, scanned orange (Pantone™ 7408C) color tiles of the data portion is recognized as orange (Pantone™ 715C) color tiles. In other words, by relating step, the color of the scanned color barcode may be amended on the basis of the reference color information.

In this example, the scanned color barcode includes the reference color tiles and color tiles of orange (Pantone™ 7408C), green (Pantone™ 3405C), blue (Pantone™ 2925C), red (Pantone™ 484C), pink (Pantone™ 672C) and yellow (Pantone™ 107C). As a result of reproducing, the color barcode including the reference color tiles and the color tiles of orange (Pantone™ 715C), green (Pantone™ 340C), blue (Pantone™ 285C), red (Pantone™ 485C), pink (Pantone™ 672C) and yellow (Pantone™ 102C) is printed.

EXAMPLE 3-1

The color barcode produced or reproduced by the way shown in the examples 1-1, 1-2, 2-1 and 2-2 is read in order to obtain a data form the color barcode. In the following, the example of an apparatus and a method for reading the color barcode will be explained.

A color barcode reading apparatus comprises a reference color information storing device, a scanning device, a relating device and a retrieving device.

As such color barcode reading apparatus, a color barcode reader, a color copying machine or a color multi function printer including copying function may be used. In such embodiment, all of the reference color information storing device, the scanning device, the relating device and the retrieving device are contained in one unit.

On the other hand, as such color barcode reading apparatus, a system including several units connected with each other with or without wire, such as a system including a personal computer and an image scanner which are apart and are connected with each other, may be used.

Next, each element of the color barcode reading apparatus is explained as follows.

The scanning device scans the color reference portion of the color barcode and the data portion of the color barcode. As the scanning device, in the case that the color barcode reproducing apparatus is the color barcode reader, the color copying machine or the color multi function printer, a scanning portion of the color barcode reader, the color copying machine or the multi function color printer may be comprised. As the scanning device, in the case that the color barcode reproducing apparatus is a system including a computer and an image scanner apart, an image scanner such as a flat bed scanner may be comprised.

The reference color information storing device stores a reference color information beforehand.

The reference color information includes information about what colors should be filled in reference color tiles of the color reference portion. The information about what colors should be filled in reference color tiles may be expressed with defined color value, such as Pantone™ color, LAB value (La*b* value or Lab value), HSV and so on.

In this example, the reference color information includes information about where each of the reference color tiles should be located and what color should be filled in each of the reference color tiles. For example, the reference color information includes information, which six reference color tiles are aligned at 5 mm above the data portion at right down of the document and the color of leftmost reference color tile is red (Pantone™ 485C), the color of next right reference color tile is orange (Pantone™ 715C), the color of next right reference color tile is blue (Pantone™ 285C), the color of next right reference color tile is green (Pantone™ 340C), the color of next right reference color tile is yellow (Pantone™ 102C) and the color of rightmost reference color tile is pink (Pantone™ 672C).

As the reference color information storing device, in the case that the color barcode reading apparatus is a color barcode reader, a color copying machine or a color multifunction printer, a memory or a hard disk or an external and/or a removable information storing device, such as a CD and/or DVD-ROM and the reproducing device for them of the color barcode reader, the color copying machine or the color multifunction printer may be comprised. As the reference color information storing device, in the case that the color barcode reading apparatus is a system including a computer and an image scanner apart, a memory, a hard disk of the computer, or an external and/or a removable information storing device, such as a CD and/or DVD-ROM and the reproducing device for them of the computer may be comprised.

The relating device relates each color of the reference color information stored in the reference color information storing device to each color of the reference color tile of the color reference portion scanned by the scanning device. As the relating device, in the case that the color barcode reading apparatus is the color barcode reader, the color copying machine or the color multi function printer, an IC or a CPU of the color barcode reader, the color copying machine or the color multi function printer may be comprised, if necessary in combination with a software. As the relating device, in the case that the color barcode reading apparatus is a system including a computer and an image scanner apart, an IC or a CPU of the computer or the image scanner may be comprised, if necessary in combination with a software.

The retrieving device retrieves the data by decrypting the scanned data portion according to the results of the relating device. As the retrieving device, in the case that the color barcode reading apparatus is the color barcode reader, the color copying machine or the color multi function printer, an IC or a CPU of the color barcode reader, the color copying machine or the color multi function printer maybe comprised, if necessary in combination with a software. As the retrieving device, in the case that the color barcode reading apparatus is a system including a computer or the image scanner may be comprised, if necessary in combination with a software.

The color barcode reading apparatus may further comprise a color barcode data storing device which stores a data of the color barcode scanned by the scanning device, a data obtained from a result of the relating step by the relating device or a data obtained from a result of the retrieving step by the retrieving device. As the color barcode data storing device, in the case that the color barcode reading apparatus is the color barcode reader, the color copying machine or the color multi function printer, a memory of the color barcode reader, the color copying machine or the multi function color printer may be comprised. As the color barcode data storing device, in the case that the color barcode reading apparatus is a system including a computer, an image scanner and a color printer apart, a memory of the computer or the color printer, a hard disk of the computer, or a external and/or a removable information storing device, such as a CD and/or DVD-ROM and the reproducing device for them of the computer may be comprised.

Using the color barcode reading apparatus of this example, the color barcode is reproduced as follows.

A method for reading a color barcode comprises a storing step which stores the reference color information, a scanning step which scans the color reference portion including the reference color tiles, a relating step which relates each color of the reference color information stored to each color of the reference color tile of the scanned color reference portion, a scanning step which scans the data portion and a retrieving step which retrieves the data by decrypting the scanned data portion according to the result of the relating step and the scanning step of the color reference portion and the data portion.

In this example, the reference color information includes information about where each of the reference color tiles should be located and what color should be filled in each of the reference color tiles. In the relating step, each color of the reference color information stored is related to each color of the reference color tile of the scanned color reference portion on the basis of the information about where each of the reference color tiles should be located and what color should be filled in each of the reference color tiles.

In the following, the detailed description of one of examples of the above method will be explained, referring to FIG. 4.

Figure 4:
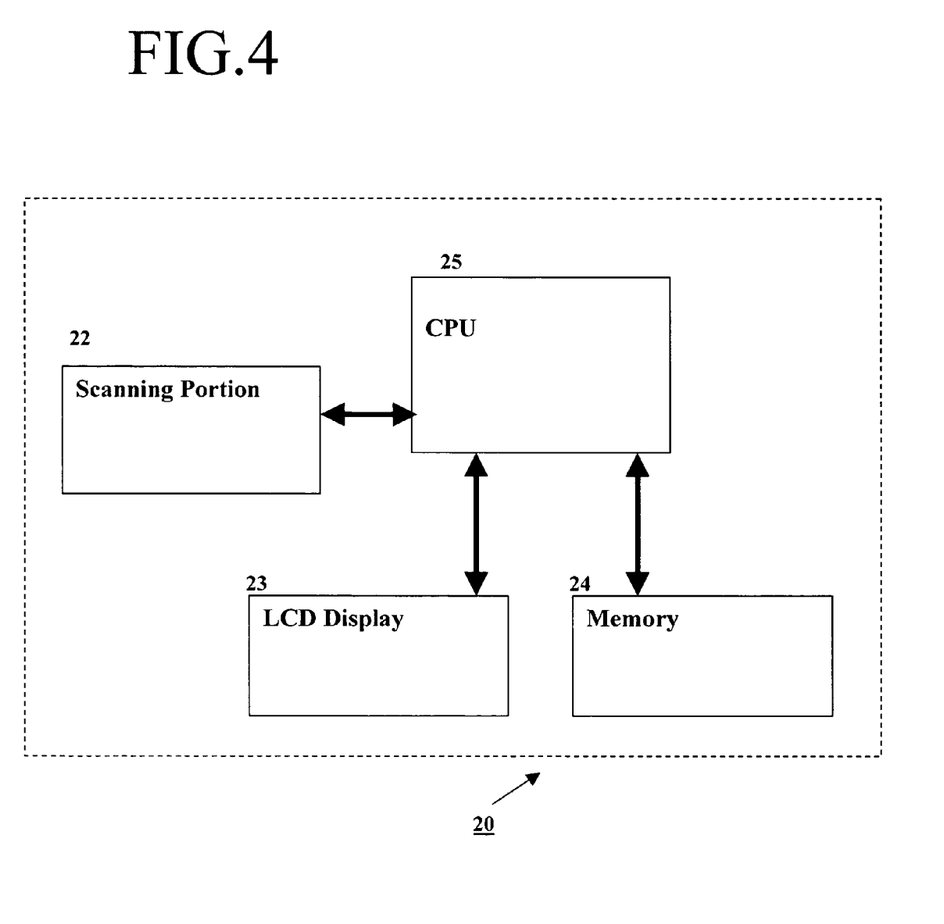
FIG. 4 is a block diagram of a color barcode reading apparatus as one of embodiment of the present invention.

In FIG. 4, a color barcode reader 20 is shown as the color barcode reading apparatus for the above method.

In advance, the reference color information is stored in a memory 24 as the reference color information storing device. In this example, the reference color information includes information, which six reference color tiles are aligned at 5 mm above the data portion at right down of the document and the color of leftmost reference color tile is red (Pantone™ 485C) the color of next right reference color tile is orange (Pantone™ 715C), the color of next right reference color tile is blue (Pantone™ 285C), the color of next right reference color tile is green (Pantone™ 340C), the color of next right reference color tile is yellow (Pantone™ 102C) and the color of rightmost reference color tile is pink (Pantone™ 672C).

A paper, a sheet, a document or a book etc. affixing the color barcode 1 comprising the color reference portion 2 comprising six reference color tiles 21 and the data portion 3 comprising several color tiles 31 is scanned by the scanning portion 22, which is the scanning device, of the color barcode reader 20 and the color barcode is changed into a digital data.

Alternatively, to get a digital data of the color barcode, some digital data, such as a data recorded in CD-ROM, DVD-ROM or a hard disk or a digital data sent via a network, may be read by a computer (not disclosed in FIG. 4) connected with the color barcode reader 20 and sent from the computer to the color barcode reader 20. As stated in the above, usually the color information portion scanning step and the data portion scanning step is done simultaneously.

Next, in the relating step, data of each of the reference color tile 21 is extracted from the data of the scanned document and each color used in the reference color tiles 21 is retrieved and analyzed. For example, as a result of analyzing scanned reference color tiles 21 by CPU 25, it is recognized that the color of leftmost scanned reference color tile is red (Pantone™ 485C), the color of next right scanned reference color tile is purple (Pantone™ 512C), the color of next right scanned reference color tile is blue (Pantone™ 2925C), the color of next right scanned reference color tile is green (Pantone™ 340C), the color of next right scanned reference color tile is yellow (Pantone™ 102C) and the color of rightmost scanned reference color tile is pink (Pantone™ 672C).

Each color of the reference color information stored is related by CPU 25 as the relating device to each color of the reference color tile 21 of the scanned color reference portion 2 on the basis of the information about where each of the reference color tiles should be located and what color should be filled in each of the reference color tiles.

The color of the reference color information stored in the memory 24 for the leftmost reference color tile is red (Pantone™ 485C). And the color of the scanned leftmost reference color tile is red (Pantone™ 485C). Therefore, the red (Pantone™ 485C) of the reference color information is related to the red (Pantone™ 485C) of the scanned reference color tile by CPU 11. Next, the color of the reference color information stored in the memory 24 for the next right reference color tile is orange (Pantone™ 715C). And the color of the scanned next right reference color tile is purple (Pantone™ 512C). Therefore, the orange (Pantone™ 715C) of the reference color information is related to the purple (Pantone™ 512C) of the scanned reference color tile by CPU 11 even though the orange and purple are different color. As stated the above, the relating step is repeated. The result of the relating step is as described in Table 4. The result of the relating step is recorded in the memory 24.

TABLE 4

| No. | Location of the reference color tile | The color of the reference color information | The color of the scanned reference color tile |
|---|---|---|---|
| 1 | Leftmost | red (Pantone ™ 485C) | red (Pantone ™ 485C) |
| 2 | Next right to 1 | orange (Pantone ™ 485C) | purple (Pantone ™ 512C) |
| 3 | Next right to 2 | blue (Pantone ™ 285C) | blue (Pantone ™ 2925C) |
| 4 | Next right to 3 | Green (Pantone ™ 340C) | green (Pantone ™ 340C) |
| 5 | Next right to 4 | yellow (Pantone ™ 102C) | yellow (Pantone ™ 102C) |
| 6 | Rightmost | pink (Pantone ™ 672C) | pink (Pantone ™ 672C) |

As a result of the relating step, each color of the scanned a reference color tiles is recognized by CPU 25 as each color of the reference color information stored in the memory 24. That is to say, purple (Pantone™ 512C) of the scanned reference color tile is recognized as orange (Pantone™ 485C). Blue (Pantone™ 2925C) of the scanned reference color tile is recognized as blue (Pantone™ 285C).

The color of the color tiles of the data portion is recognized on the basis of the result of the relating step. That is to say, scanned purple (Pantone™ 512C) color tiles of the data portion is recognized as orange (Pantone™ 485C) color tiles. Blue (Pantone™ 2925C) color tiles of the data portion is recognized as blue (Pantone™ 285C) color tiles. Red (Pantone™ 485C) color tiles of the data portion is recognized as red (Pantone™ 485C) color tiles. In other words, by relating step, the color of the scanned color barcode may be amended on the basis of the reference color information.

Then, the data of the data portion is retrieved by decrypting the scanned data portion according to the result of the relating step by CPU 25 as the retrieving device in order to obtain data recorded in the data portion. In this retrieving step, the colors of the data portion of printed color barcode are regarded as the Paontone™ colors represented by the reference color information according to the result of the relating step. To decrypt, DES or RC4 etc. decryption method may be used. The retrieved data may be stored in a memory 24 as the color barcode data storing device.

In this example, the scanned color barcode includes the reference color tiles and the color tiles of red (Pantone™ 485C), purple (Pantone™ 512C), blue (Pantone™ 2925C), green (Pantone™ 340C), yellow (Pantone™ 102C) and pink (Pantone™ 672C). As a result of reading, the color barcode is regarded as the color barcode including the reference color tiles and the color tiles of red (Pantone™485C), orange (Pantone™ 715C), blue (Pantone™ 285C), green (Pantone™ 340C), yellow (Pantone™ 102C) and pink (Pantone™ 672C).

By doing such, integrity and authenticity of the color barcode can be maintained even if the color barcode is copied or reprinted.

Incidentally, in the case that the color reference portion is located far from the data portion, the data portion or other portion of the color barcode which is located near the data portion may include information about where the color reference portion is.

In the retrieving step, a data of the data portion or the other portion is extracted from the scanned digital data. And the data of the data portion or the other portion is decrypted by CPU 25 as the retrieving device of the color barcode reader 20 in order to obtain the information where the color reference portion is. For example, the information, which the color reference portion is at upper right of the 1 page of the document. To decrypt, DES or RC$ etc. decryption method may be used. By this step, the information about where the color reference portion is can be retrieved.

Next, according to the information where the color reference portion is, the color reference portion at the upper right of the 1 page of the document is extracted from the scanned digital data and is obtained. This extraction is included in the scanning step for the color reference portion.

That is to say, in this case, the scanning step for the color reference portion is conducted after the completion of the scanning step for the data portion or the other portion and a part of the retrieving step for the data portion or the other portion.

Instead of or in addition to the information about where the color reference portion is, the information about what shape or pattern the color reference portion is may be recorded in the data portion or the other portion and used.

Incidentally, the data portion or the other portion of the color barcode may include information about how the color reference portion is used. In the retrieving step for the data portion or the other portion, the information about how the color reference portion is used is retrieved. For example, in the case that several identical color reference portions are located at four corners of 1 page of a document, the information about how the color reference portion is used may include the information that the average of the four color values of the reference color tiles of four color reference portion can be used as the color value of the reference color tiles. And the relating step is conducted on the basis of the average of color value of the four color reference portion.

And, the relating step is conducted on the basis of the information about how the color reference portion is used.

On the other hand, the color barcode produced or reproduced by the way of this invention may be read by the method including only scanning step and retrieving step for the data portion without the relating step.

EXAMPLE 3-2

Next, the other example of an apparatus and a method for reading the color barcode will be explained as follows.

The color barcode reading apparatus of this example is almost similar with the color barcode reading apparatus of Example 3-1. The description about what is similar to the Example 3-1 is omitted.

In this example, the reference color information includes information about where the color reference portion should be located, what colors should be filled in the reference color tiles and a permissible range of each color of the reference color tiles of scanned color reference portion. Instead of or in addition to information about where the color reference portion should be located, information about what shape or pattern the color reference portion should be may be included in the reference color information.

The permissible range may be defined by a range of brightness of color or a range of chroma saturation etc., or several specific values of defined color value.

For example, the reference color information includes information, which the color reference portion is located at 5 mm above the data portion at right down of the document and red (Pantone™ 485C), orange (Pantone™ 715C), blue (Pantone™ 285C), green (Pantone™ 340C), yellow (Pantone™ 102C) and pink (Pantone™ 672C) are used for the reference color tiles and the color tiles and a permissible range of each color of the reference color tile. However, different from Example 3-1, the reference color information does not include information about what should be filled with what color. In this example, the permissible range for red are Pantone™ 484C, Pantone™ 486C, Pantone™ 1788C, Pantone™ 1795C, Pantone™ 1797C, Pantone™ 186C, Pantone™ 193C, Pantone™ 1935C. The permissible range for each color is described in Table 5. Such permissible range is recorded in the memory 24 beforehand.

TABLE 5

| Color of the reference color information | Permissible range |
|---|---|
| red (Pantone ™ 485C) | Pantone ™ 485C, Pantone ™ 484C, Pantone ™ 486C, Pantone ™ 1788C, Pantone ™ 1795C, Pantone ™ 1797C, Pantone ™ 186C, Pantone ™ 193C, Pantone ™ 1935C. |
| orange (Pantone ™ 715C) | Pantone ™ 715C, Pantone ™ 713C, Pantone ™ 714C, Pantone ™ 716C, Pantone ™ 717C, Pantone ™ 718C, Pantone ™ 7408C, Pantone ™ 7409C, Pantone ™ 021C. |
| blue (Pantone ™ 285C) | Pantone ™ 285C, Pantone ™ 284C, Pantone ™ 286C, Pantone ™ 2925C, Pantone ™ 2935C, Pantone ™ 2945C, Pantone ™ 299C, Pantone ™ 300C, Pantone ™ 301C. |
| green (Pantone ™ 340C) | Pantone ™ 340C, Pantone ™ 339C, Pantone ™ 341C, Pantone ™ 3395C, Pantone ™ 3405C, Pantone ™ 3415C, Pantone ™ 347C, Pantone ™ 348C, Pantone ™ 354C. |
| yellow (Pantone ™ 102C) | Pantone ™ 102C, Pantone ™ 100C, Pantone ™ 101C, Pantone ™ 102C, Pantone ™ 106C, Pantone ™ 107C, Pantone ™ 108C, Pantone ™ 113C, Pantone ™ 114C. |
| pink (Pantone ™ 672C) | Pantone ™ 672C, Pantone ™ 670C, Pantone ™ 671C, Pantone ™ 673C, Pantone ™ 674C, Pantone ™ 678C, Pantone ™ 679C, Pantone ™ 680C, Pantone ™ 686C. |

In a method for reading a color barcode of this example, each color of the reference color information stored is related to each color of the color of the reference color tile of the scanned color reference portion on the basis of a result of an analysis whether each of the colors of the color reference tiles is within the permissible range or not.

In this relating step, the color reference portion is extracted by CPU 25 from the data of the scanned document according to the information where the color reference portion should be located. Then, the extracted color reference portion is analyzed by CPU 25.

For example, as a result of analyzing the color reference portion by CPU 25, it is recognized that there are six reference color tiles in the color reference portion and the color of leftmost scanned reference color tile is orange (Pantone™ 7408C), the color of next right scanned reference color tile is green (Pantone™ 3405C), the color of next right scanned reference color tile is blue (Pantone™ 2925C), the color of next right scanned reference color tile is red (Pantone™ 484C), the color of next right scanned reference color tile is pink (Pantone™ 672C) and the color of rightmost scanned reference color tile is yellow (Pantone™ 107C).

Next, each color of the reference color information stored in the memory 24 is related to each color of the reference color tile of the color reference portion on the basis of a result of an analysis whether each of the color of the scanned color reference tiles is within the permissible range or not.

For example, as a result of the relating step, CPU 25 recognizes that the orange (Pantone™ 7408C) of the scanned reference color tile is within the permissible range of orange as described in Table 2. Therefore, the orange (Pantone™ 715C) of the reference color information stored is related to the orange (Pantone™ 7408C) of the scanned reference color tile. The green (Pantone™ 3405C) of the scanned reference color tile is withing the permissible range of green as described in Table 5. Therefore, the green (Pantone™ 3405C) of the reference color information stored is related to the green (Pantone™ 340C) of the scanned reference color tile.

As stated the above, the relating step is repeated. The result of the relating step is shown in Table 6.

TABLE 6

| No. | Location of the reference color tile | The color of the reference color information | The color of the scanned reference color tile |
|---|---|---|---|
| 1 | Leftmost | orange (Pantone ™ 715C) | Orange (Pantone ™ 7408C) |
| 2 | Next right to 1 | green (Pantone ™ 340C) | green (Pantone ™ 3405C) |
| 3 | Next right to 2 | blue (Pantone ™ 285C) | blue (Pantone ™ 2925C) |
| 4 | Next right to 3 | red (Pantone ™ 485C) | red (Pantone ™ 484C) |
| 5 | Next right to 4 | pink (Pantone ™ 672C) | pink (Pantone ™ 672C) |
| 6 | Rightmost | yellow (Pantone ™ 102C) | yellow (Pantone ™ 107C) |

If as a result of the relating step, CPU 25 recognizes that certain color of the scanned reference color tile is not within any permissible range of the reference color information, the relating step cannot be completed. In such case, a LCD display 23 of the color barcode reader 20 displays warning message such as "this color barcode cannot be read."

As a result of relating step, each color of the scanned reference color tiles 21 is recognized by CPU 25 as each color of the reference color information. That is to say, orange (Pantone™ 7408C) of the scanned reference color tile is recognized as orange (Pantone™ 715C).

The color of the color tiles of the data portion is recognized on the basis of the result of the relating step. That is to say, scanned orange (Pantone™ 7408C) color tiles of the data portion is recognized as orange (Pantone™ 715C) color tiles. In other words, by relating step, the color of the scanned color barcode may be amended on the basis of the reference color information.

In this example, the scanned color barcode includes the reference color tiles and color tiles of orange (Pantone™ 7408C), green (Pantone™ 3405C), blue (Pantone™ 2925C), red (Pantone™ 484C), pink (Pantone™ 672C) and yellow (Pantone™ 107C). As a result of reading, the color barcode is regarded as the color barcode including the reference color tiles and the color tiles of orange (Pantone™ 715C), green (Pantone™ 340C), blue (Pantone™ 285C), red (Pantone™ 485C), pink (Pantone™ 672C) and yellow (Pantone™ 102C).

On the other hand, the color barcode produced or reproduced by the way of this invention may be read by the method including only scanning step and retrieving step for the data portion without the relating step.

Disclosed embodiments can be varied by a skilled person without departing from the spirit and scope of the invention.

What is claimed is:

1. A method for producing a color barcode, comprising:
    producing a color reference portion, the color reference portion being a part of the color barcode and comprising reference color tiles filled with colors which are used in a data portion of the color barcode,
    encrypting data,
    producing the data portion according to the result of the encrypting step of the data, the data portion being a part of the color barcode, comprising the several color tiles in which colors filling in the color reference tiles of the color reference portion are assigned and representing the data,
    printing the color barcode comprising the color reference portion and the data portion with the colors according to the results of the producing step of the color reference portion and the producing step of the data portion.

2. The method for producing the color barcode of claim 1, further comprising, deciding colors used for the color reference portion before the producing step of the color reference portion, and
    wherein the color reference portion is produced according to the result of the deciding step.

3. The method for producing the color barcode of claim 1, further comprising, storing data of the color reference portion beforehand, and
    wherein the color reference portion is produced on the basis of the data of the color reference portion stored.

4. The method for producing the color barcode of claim 1, wherein in the printing step the color reference portion is printed in the place where is near the data portion.

5. The method for producing the color barcode of claim 1, wherein in the printing step the color reference portion is printed in the place where is far from the data portion.

6. The method for producing the color barcode of claim 1, wherein the data portion includes information about where the color reference portion is or how the color reference portion is used.

7. A color barcode producing apparatus, comprising:
    a color reference portion producing device which produces a color reference portion, the color reference portion being a part of the color barcode and comprising reference color tiles filled with colors which are used in a data portion of the color barcode,
    a data portion producing device which encrypts data and produces the data portion according to the result of the color reference portion producing device and the result of the encryption of the data, the data portion being a part of the color barcode, comprising the several color tiles in which colors filling the reference color tiles of the color reference portion are assigned and representing the data,
    a printing device which prints the color barcode comprising the color reference portion and the data portion with the colors according to the results of the color reference portion producing device and the data portion producing device.

8. The color barcode producing apparatus of claim 7, further comprising, deciding device which decides colors used for the color reference portion before the color reference portion producing device produces the color reference portion, and wherein the color reference portion is produced according to the result of the deciding device.

9. The color barcode producing apparatus of claim 7, further comprising, storing device which stores data of the color reference portion beforehand, and
    wherein the color reference portion producing device produces the color reference portion on the basis of the data of the color reference portion stored in the storing device.

10. A substrate imprinted thereon a color barcode, wherein the color barcode comprises:
    a color reference portion comprising reference color tiles which are used in a data portion of the color barcode, wherein
    the data portion comprises encrypted data, and
    the reference color tiles are assigned to the color barcode and represent the encrypted data.

* * * * *